United States Patent [19]

Sankaran

[11] Patent Number: 4,771,991
[45] Date of Patent: Sep. 20, 1988

[54] SYSTEM FOR HANDLING TRIMMED EDGE METAL SCRAP MATERIAL OF INDETERMINATE LENGTH

[75] Inventor: Subbiah Sankaran, Murraysville, W. Va.

[73] Assignee: Kaiser Aluminum & Chemical Corporation, Oakland, Calif.

[21] Appl. No.: 45,966

[22] Filed: May 4, 1987

[51] Int. Cl.[4] .............................................. B23D 19/04
[52] U.S. Cl. ................................... 266/200; 266/901; 83/105
[58] Field of Search ............... 266/160, 200, 214, 102, 266/901, 103; 373/142, 146; 83/105, 103

[56] References Cited

U.S. PATENT DOCUMENTS

| | | | |
|---|---|---|---|
| 2,446,637 | 8/1948 | Crampton et al. | 266/200 |
| 2,706,001 | 4/1955 | Wilder | 83/105 |
| 4,375,885 | 3/1983 | Shigihara et al. | 266/214 |
| 4,501,177 | 2/1985 | Logan et al. | 83/105 |
| 4,688,771 | 8/1987 | Eckert et al. | 266/200 |

Primary Examiner—L. Dewayne Rutledge
Assistant Examiner—S. Kastler
Attorney, Agent, or Firm—A. E. Barlay

[57] ABSTRACT

A system for continuously removing and transporting trimmed edge metal scrap material in the form of a indeterminate length of ribbon from a strip edge trimming or slitting station in a strip processing line to a final disposal station wherein the trimming station can be advantageously disposed in the path of travel of the strip of metal being processed. In a preferred embodiment of the invention, the said system includes a curvilinear enclosed conveyor means, one open end of which is disposed in the area of the trimming station and the other open end of which is disposed adjacent to the disposal station for continuously capturing the trimmed edge metal scrap material from the trimming station as it is cut from the moving strip of metal and then directing it to the disposal station at the proper rate of speed. The conveyor means is advantageously provided with linear accelerator components which act in conjunction with the trimmed scrap material for propelling the trimmed scrap material in a substantially noiseless fashion to the final disposal station which in one advantageous embodiment of the invention can comprise a melting furnace.

6 Claims, 2 Drawing Sheets

U.S. Patent  Sep. 20, 1988  Sheet 1 of 2  4,771,991
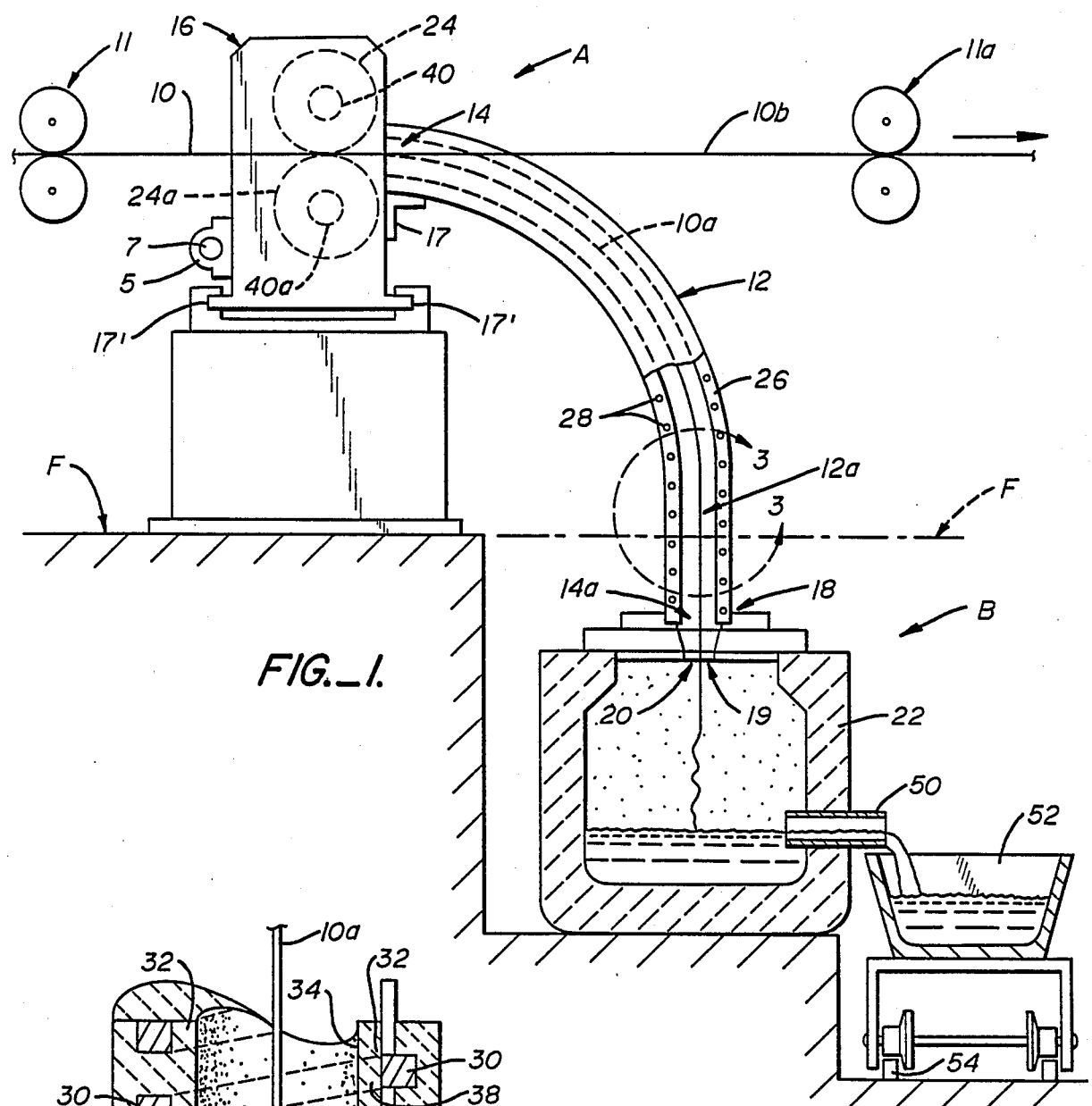
FIG._1.
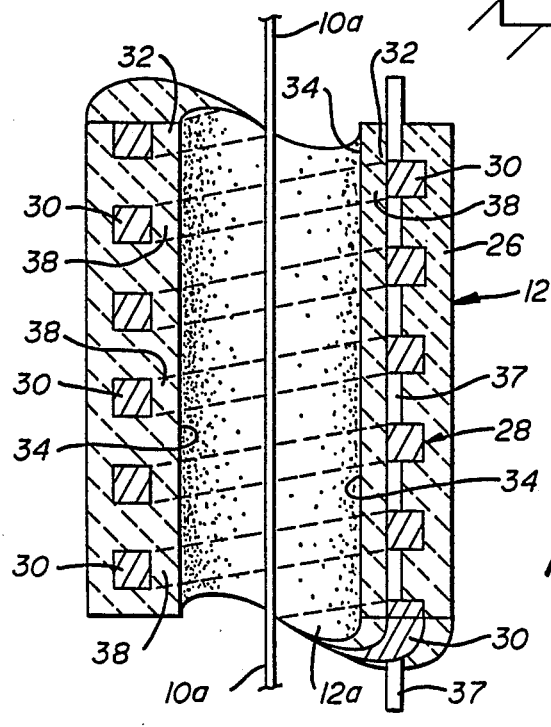
FIG._3.

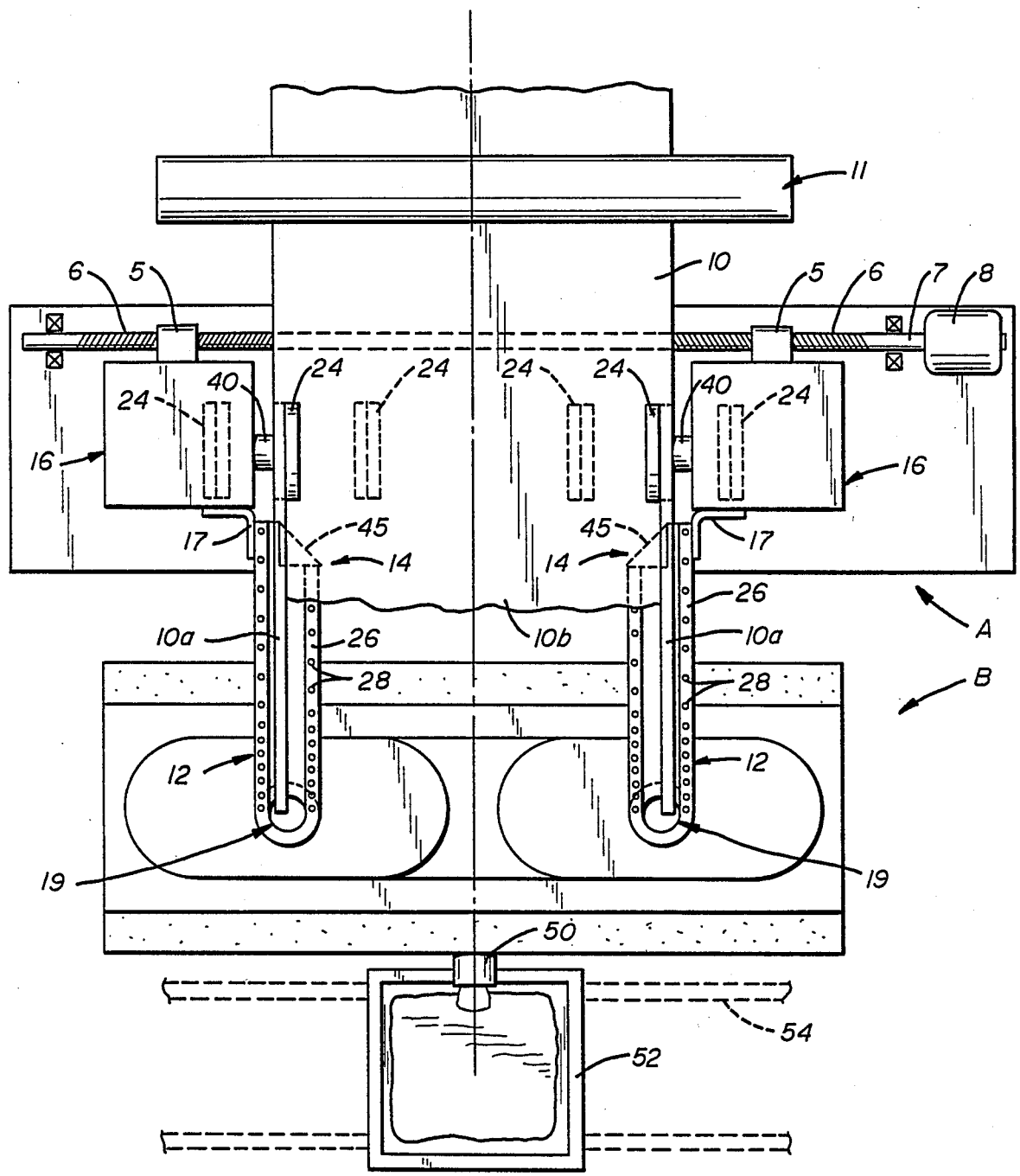
FIG._2.

SYSTEM FOR HANDLING TRIMMED EDGE METAL SCRAP MATERIAL OF INDETERMINATE LENGTH

BACKGROUND OF THE INVENTION

This invention relates to a system for the collection and handling of trimmed scrap material as it exits from the discharge side of trimming or slitting devices used in a strip processing line. More particularly, it relates to an improved use of linear accelerator devices for propelling trimmed metal scrap material away from the path of the moving parent strip and to a final disposal station. The edges of metal strip, such as rolled aluminum alloy strip, develop cracks during the rolling process, and generally a narrow band or ribbon of metal is subsequently removed continuously as scrap from both edges of the strip in a suitable processing operation. Edge trimming and slitting equipment for multiple widths utilize circular knives on the top and bottom of the horizontally moving strip. The scrap trim generated at each edge of the moving strip has to be diverted away from the parent or moving strip for disposal. Scrap chutes have been and are normally utilized for this purpose. These chutes generally comprise mechanical guides and, in some cases, are equipped with special pneumatic handling means. The ribbons of trimmed scrap after collection are then either chopped into convenient lengths, wound on scrap winders or compacted into scrap balls. In heavier gauge applications, the scrap is sometimes cut into pieces by choppers mounted on the trimmer arbor. In such instances, the cut scrap material is then diverted through chutes to suitable conveying systems and finally disposed of.

The aforesaid handling of metal strip scrap material, such as trimmed aluminum alloy scrap of indeterminate length, poses certain problems. Since a light-gauge narrow aluminum strand has very little stiffness, it is not always possible to feed the strand reliably through mechanical chutes without jamming. Process or handling speeds are generally limited by the ability of the handling equipment to reliably divert the trimmed material away from the trimming or slitting knives without causing jams. Where scrap choppers are used, the processing speed is also limited by the type of machine employed. A rotating knife holder and a stationary anvil machine can cause the trimmed scrap material to accordion between cuts, and they are not normally suitable for very light gauge aluminum scrap handling. Double rotating knives with precise backlash adjustments have been used with a certain degree of success but the process handling speeds involved are still limited by the design and travel speeds of the knives. Scrap winders that handle continuous ribbons of metal of indeterminate length are also prone to strip breakage, which, in turn, can cause process interruptions and line shut downs.

In addition to the aforesaid problems of handling, there are noise problems caused by the equipment used, and in the case of where heavier gauge metal is trimmed, the noise levels can be excessively high and undesirable as regards the equipment operators. Heavy gauge scrap transported through metal chutes to conveyors and finally falling into scrap tubs also produces extreme noise situations. Very light metal products of aluminum, such as aluminum foil, can be pneumatically handled with-less noise, but noise problems can still occur as regards foil handling in the areas of the high pressure blowers used with the foil conveyors.

Even where the aforesaid scrap handling problem situations are to some extent avoided or corrected, further problems remain as to the final disposal of the collected scrap material. Regardless, for example, of whether the trimmed scrap material, e.g., ribbonized scrap is chopped up, wound or compacted into a ball, the scrap still has to be periodically transported from various sources within a fabrication facility to a melting operation for recycling. The volume of such scrap is high due to the low density of the package, and considerable labor costs are associated with such transportation schemes. The segregation and marshalling of edge trim scrap for melting create major difficulties at a cast house relative to floor space requirements and require good planning in order to reduce melt loss by sequenced charging into the furnaces. The handling of scrap at the furnaces, in turn, causes long charging sequences because of the low density packages involved and potential alloy mixing problems due to improper alloy identification.

The instant invention eliminates the conventional chutes, mechanical scrap chopping, winding, or balling equipment and significantly simplifies the handling of trimmed metal scrap generated in a processing line for aluminum alloys and the like by the advantageous use of linear accelerator motor components in an improved and unique fashion. Linear accelerator motors have been items such as the accelerators of U.S. Pat. No. 4,462,529 used in the past to handle the transport of various wherein tubing is conveyed; U.S. Pat. No. 4,305,334, which relates to the movement of bulk material carrying cars in a tube-like conveyor; and U.S. Pat. No. 3,616,978, which involves the conveying of tubing and bar stock sections. U.S. Pat. Nos. 396,792; 1,441,250; 2,561,377; and 3,557,598 are also representative of other uses to which linear accelerators can be put in the conveying of various products other than ribbonized scrap of indeterminate length.

Linear induction motors or accelerators have also been employed in the past in connection with the feeding of loose metal scrap to a melting furnace wherein the induction motor is incorporated in the furnace structure at the entry port of the furnace for the purpose of controlling the level of the melt and downward flow of the molten metal at such entry port as illustrated, for example in U.S. Pat. No. 4,589,637. The melting furnace of U.S. Pat. No. 4,375,885 utilizes a discharge conveyor trough for the molten metal that has a linear accelerator incorporated in its structure, while in the furnace of U.S. Pat. No. 4,487,401, molten metal is moved about and transferred by induction devices. However, such accelerators as are disclosed in the aforesaid patents are not intended or designed for use in conveying in a substantially continuous fashion an indeterminate length or ribbon of metal scrap, such as light metal scrap, away from a trimming knife station and thereafter transporting the same directly and noiselessly to a melting furnace in an efficient and economical manner.

Accordingly, it is a primary purpose of the instant invention to collect and convey in an improved fashion ribbons of indeterminate lengths of scrap metal that are recovered from trimming knives in a strip processing line, such as aluminum scrap metal, directly from the trimming knives to a collection or disposal station, such as a melting furnace.

It is a further purpose of the instant invention to provide a unique system of collection and transfer of trimmed metal scrap directly from the trimming knife station of a metal strip processing line or the like in the form of a ribbon of indeterminate length to a melting furnace while avoiding all of the normal intermediate steps of chopping, coiling or balling the ribbon, etc. and while utilizing a linear accelerator device.

It is a further object of the instant invention to provide an improved and relatively trouble-free collection and transport system using linear induction motor components for capturing and conveying continuous ribbons of trimmed edge metal scrap material directly from the trimming knives of a trimmer or slitter in a strip processing line through a closed tubular conveyor into a melting furnace in a relatively noiseless and efficient fashion.

These and other objects and purposes of the instant invention are accomplished by providing an enclosed tube or tube-like conveyor of suitable refractory material for each trimmed scrap ribbon wherein the induction motor or accelerator components are advantageously incorporated in the wall structure of such conveyor and whereby such components can act in conjunction with the enclosed scrap ribbons to move successive portions of the ribbons through their respective conveyors.

In one preferred embodiment of the invention, the magnetic field generated by the motor components causes the captured metal strip or ribbon of scrap metal to travel a short distance forward in a horizontal plane and then downward in a gradual fashion through an arc that has a generous radius to a vertical plane in its movement from a trimming station to and through the entry port of a melting furnace. This furnace is located at a level below that of the trimming knives such as below the floor of the strip processing line building in which the knives are located. The trimmed ribbon of scrap is advantageously held in the center or substantially the center of the closed conveyor or tube by the appropriate disposition of the AC windings in the conveyor and the regulation of current and its frequency relative to the width and particular gauge of the trimmed material being handled. Since the trimmed scrap does not come into contact with the walls of the tubular conveyor, no significant amount of noise is generated. At the same time, the trimmed scrap material will be propelled within the chamber formed by the tubular conveyor under the required tension and speed so as to be fully coordinated with and match the speed of the slitting or trimming operation, thereby avoiding jamming of the scrap in the tubular conveyor.

As certain portions of the trimmed scrap ribbon are continuously fed or directed into the open end of the tubular conveyor, other portions of the trimmed scrap material will have been simultaneously discharged into the top of a conventional or specially designed induction melting furnace located below the floor of the facility in which the trimming knives are located while still, of course, being in line with such knives. The induction furnace can be of a conventional coreless or channel type using high frequency and adequate power to melt the incoming scrap ribbon material at a rate that is compatible with the gauge, width, speed and cross sectional size of the ribbonized scrap material as it enters the furnace.

A molten metal heel can be advantageously maintained at all times in the furnace to maintain optimum efficiency of operation; and in a further advantageous embodiment of the invention, the molten metal, such as aluminum, in the furnace can, if desired, be continuously directed through appropriate pouring troughs into the usual aluminum metal molds commonly referred to in the trade as sow molds for solidification. In such case, the sow molds can also be carried by an indexing conveyor past the furnace whereby the conveyor is indexed each time the mold is filled to a selected weight limit all in a fashion well known in the art of casting. Further the cast sows can be automatically labelled for alloy identification and conventional mold separation, and sow stacking machinery can be added to the indexing conveyor to minimize labor, etc. Finally, the stacked metal sows can be appropriately transported to a further remelt facility, if desired.

Among the many advantages provided by the improved system of the instant invention is a substantially noiseless handling of trimmed metal scrap from trimming knives to and into a melting furnace plus limitless speeds of conveying in the case of light as well as heavy gauge materials. This, in turn, means that slitting and trimming machines in strip processing lines can be operated at their design speeds without the usual interruptions caused by the standard present-day metal scrap choppers, winders and bailers, etc. Finally, the scrap disposal problems that normally occur in the case of cut, balled, or compacted trimmed scrap aluminum or the like are greatly reduced by being able to utilize uniformly sized sows from sow molds that can be fully identified as to metal content and alloy constituents. Thereafter, the scrap now in the form of sows can be stacked and transported in high density packages directly and efficiently from the slitting operations to various recycling operations or processes.

BRIEF DISCUSSION OF THE DRAWINGS

FIG. 1 is a schematic view of one preferred embodiment of the invention and illustrates one overall arrangement of a set of trimmer heads and tubular conveyors provided with linear induction motors incorporated in the wall structures of the conveyors for diverting trimmed metal scrap ribbons from a pair of trimmer knives to a melting furnace;

FIG. 2 is a top plan view of the equipment shown in FIG. 1 with some parts being broken away or removed, with the adjustment of other parts being shown in dotted lines and with other parts being added, and it illustrates one simplified arrangement for adjustably mounting the trimmer knives and their associated conveyors to accommodate varying widths of metal strips being processed; and FIG. 3 is a cross-sectional view taken within the circumscribing circle 3 of FIG. 1 and enlarged.

DETAILED DESCRIPTION OF THE INVENTION

While it is to be understood that various equipment arrangements can be used in practicing the instant invention, one preferred and simplified embodiment will now be described in detail. It is also to be understood that while only an adjustable trimming head type operation is described, the use of fixed slitting heads is not precluded in the application of the instant invention. Accordingly, with further reference to the drawings and particularly FIGS. 1 and 2, the improved collection and conveyor system of the instant invention for trimmed metal scrap ribbons can include a pair of spaced tubular conveyors (12) located adjacent to the opposed marginal edges of a continuously moving, previously processed parent metal strip (10) in the area of a scrap trimming station (A). The strip (10) which can involve metal from a previously rolled aluminum alloy is directed to the station (A) by a set of feed rolls (11) and removed therefrom by transfer rolls (11a ). The open top-end entry portion (14) of each tubular conveyor (12) is suitably secured to an adjustable and movable trimmer head or carrier (16) so as to accommodate various widths of strip in a manner well known in the art, such as by being directly secured by bracket elements (17) to the trimmer heads (16) for the opposing sets of top and bottom trimmer knives (24) and (24a). The opposing trimmer heads (16) in turn are appropriately slidably mounted in conventional ways (17'), while at the same time being connected by the internally threaded bracket arms (5) to the oppositely threaded portions (6) of the rotatable shaft (7) that can be rotated in either direction by the reversible motor (8) in order to adjust the knives (24) and (24a) relative to the strip (10) to be trimmed.

The exit or discharge end (18) of each conveyor is suitably accommodated, connected and sealed in a well-known manner to the slotted-type throat (19) of a scrap entry port (20) located at the top of a refractory lined induction melting furnace (22) that can constitute a disposal station B. One such furnace is that manufactured and sold by BBC Brown Boveri, Inc. of North Brunswick, N.J. as Model Number ITM-8P.

From the aforesaid description, it will now be readily observed that as the individual sets of top and bottom trimmer knives (24) and (24a) are adjusted to accommodate various widths of strip, etc. their associated conveyors (12) and conveyor entry ends (14) will likewise be automatically adjusted so as to receive the trimmed scrap (10a) while at the same time allowing the finished parent metal strip (10) to continue on to the transfer rolls (11a). While not shown or described in any detail, it is to be understood that the conveyors (12) are also suitably mounted in slotted openings in the floor (F) of the building in which the strip (10) is being processed while at the same time also being slidably anchored by means not shown to the said floor over the melting furnace (22).

Since the same type of conveyor (12) is used with each top and bottom pair of marginal edge trimming knives (24) and (24a) at opposite sides of the parent strip (10), a description of one will suffice for both. Each conveyor (12) in a preferred embodiment of the invention is fabricated from a suitable refractory material and is preferably circular in cross sectional configuration. Incorporated or built into the refractory wall (26) of each conveyor (12) as particularly indicated in FIG. 3 is a series of electromagnetic inductor motor componen-ts (28). The wall thickness of a conveyor (12), particularly in the lower part thereof, should be of a design thickness that is consistent with avoidance of overheating of the coils, etc. These components or elements (28) can be of the general type disclosed and discussed in U.S. Pat. No. 4,375,885 except that they are somewhat modified so as to comprise annular AC coils, the axes of which are aligned with and made substantially coincident with the central axis of the annular or tubular conveyor (12) in which they are incorporated. Thus, as indicated in FIG. 3, each coil (30) is mounted in its own groove (32) a selected distance inwardly from the inner surface (34) of the conveyor wall (26). These coils (30) are also all preferably mounted substantially the same distance axially inwardly of such wall surface (34) and while being axially aligned with the central axis of the conveyor for the full length of the conveyor so as to provide uniformity of flux line influence on the ribbonized scrap (10a) for its entire passage through the conveyor for reasons to be discussed hereinafter. As indicated in FIG. 3, the individual coils (30) are interconnected by a conventional core wire element (37) that is located or embedded in the refractory wall and ultimately is connected to a suitable AC power source (not shown). This arrangement permits each annular or tubular conveyor (12) to act as the stator of a polyphase electric motor and successive portions of the sheared ribbonized strip (10a) as the rotor in such a motor whereby successive portions of the ribbonized metal strip (10a) can be rapidly propelled toward and through the discharge end (18) of conveyor (12) at a rate commensurate with the rate at which the scrap material (10a) is cut from the parent strip (10).

As noted above, the preferred embodiment of the invention contemplates that the individual coils (30) will be mounted the same uniform distance inwardly from the wall surface (34) of conveyor wall (26) in the grooves (32) while also being axially aligned with the center of the conveyor opening (12a). Thereafter, the coils are sealed in place by way of the annular sealing inserts (38) also made of a suitable refractory material.

The reason for this preferred arrangement is in order to have each winding (30) force the moving ribbon of scrap (10a) to remain in substantially the center or axial part of the conveyor passage or opening (12a) during its full length of travel through the conveyor and out of contact with conveyor wall surface (34). In this way, successive portions of the scrap ribbon (10a) will continue to remain out of contact with the conveyor wall surface (34) as they are propelled through the conveyor to the furnace (22) and result in a relatively noiseless operation.

Since the conventional trimming knives (24) and (24a) as such form no significant part of the invention, they will not be discussed in detail. Suffice it to say that the cooperating upper and lower knives (24) and (24a) in each set are suitably and adjustably locked or attached to the upper and lower shafts (40) and (40a) that can be driven by motor means (not shown) in a manner well known in the art. In order to provide for an efficient simplified transfer or passage of the trimmed ribbonized scrap portions (10a), immediately after being separated from the parent strip, the geometry of the angular and somewhat cutaway mouth (45) of the top open end portion (14) of each conveyor is appropriately worked ou whereby it will readily adjust itself to and accept the leading edge and successive trailing portions of a given length (10a) of ribbonized scrap once the conveyor (12) has been adjusted along with its associated top and bottom trimming knives (24) and (24a) and locked in a set position. The mouth (45), as indicated in FIG. 2, should also be so designed as to be provided with whatever bottom and side guide means, etc. that are appropriate to ensure proper entry and continued passage of the all portions of a ribbonized scrap strip (10a) into the mouth (45) of a conveyor (12).

From the foregoing description, it will now be observed that the adjustability of the trimming heads (16) and their respective knives (24) and (24a) in each knife set as well as similar features in the case of the - ribbonized scrap receiving end portions (14) of the conveyors

(12) all mean that the system proposed is quite flexible and can be employed with varying widths of parent metal strips (10). Once the initial cut or ribbon severance is made in a marginal edge of the strip and the leading edge of such ribbon (10a) automatically drawn into the open mouth (45) of a conveyor end portion (14) the forward movement and momentum of the parent strip (10) will continue to feed the ribbon (10a) into such conveyor mouth (45) end portion (14) until the ribbon (10a) is picked up by the current passing along the coils (30) and with the succeeding portions of ribbon (10a) then assuming the status of successive portions of a continuous rotor in a linear induction motor.

The instant system further envisions the use of a continuous melting and casting operation that can function simultaneously with the trimming operations. Moreover, although only one elongated furnace is shown, it is obvious that two such furnaces can be used, one for each conveyor (12). The furnaces can be of the coreless or channel type if conventional induction types are used.

Thus, if desired, a suitable pouring trough 50, as shown in FIG. 1, can almost continuously empty molten scrap into metal molds such as sow molds (52) carried by an indexing conveyor (54) past furnace (22) as trimmed scrap ribbons are simultaneously being fed to the same furnace (22). This conveyor can be indexed or operated to move the individual empty molds (52) into metal receiving positions as the pouring trough (50) is opened and closed by suitable means to operating and nonoperating positions when the selected weight of the metal in the mold being filled by the trough or an individual filled mold itself has reached a predetermined limit. The electro mechanical controls for indexing the conveyor (54), opening and closing the pouring trough (50), and weighing the molds being filled and all the while coordinating the various operations are not shown but are well known in the metal casting industry. When these features are added to the unique system being proposed, they further enhance the value of the same.

In the final design of a conveyor (12), it may be desirable to have the coils (30) in the area of the discharge end (18) be somewhat modified relative to the design of the coils (30) in the remaining sections of the conveyor (12) in order for the scrap elements (10a) of indeterminate length to be fed to one or more furnaces at appropriate rates of speed along various sections of the conveyor (12). These appropriate and selected rates of speed, while commensurate and synchronized with the rate of travel of the parent strip (10), will thereby avoid or prevent melting or clogging problems in the inner passageway (12a) of a conveyor (12), particularly in the vicinity of the discharge end (18) of the conveyor. In other words, these precautions are desirable in order to prevent the heat of the metal in the furnace (22) from adversely affecting the moving ribbonized scrap elements (10a) whereby they would vaporize or melt prior to entering the main furnace chamber and atmosphere. This, in turn, means that the regulation of the AC current in the linear induction components and its frequency, which is also dependent upon the gauge and width of the ribbonized strips (10a) being processed, must be carefully monitored and controlled. Since these conditions will change, depending upon the particular metal being handled as well as strip gauge and widths, the aforesaid conditions can be best determined by experimental runs once the equipment has been set up, including the particular furnace environments and melt levels as a consequence of which no detailed discussion of the same is believed required.

Although preferred embodiments of the instant invention have been shown and described, it is obvious that various changes and modifications may be made therein without departing from the spirit and scope thereof as defined in the appended claims wherein:

1. A system for continuously removing and transporting trimmed metal edge scrap material of indeterminate length and ribbon shaped form from an edge trimming station to a scrap disposal station, said system comprising:

a strip edge trimming station disposed in the path of travel of a continuously moving strip of metal, said strip edge trimming station being operable to trim said metal edge scrap material from said moving strip of metal;

a tubular enclosed conveyor for continuously receiving said trimmed metal edge scrap material removed from said moving strip of metal at said strip edge trimming station, said tubular enclosed conveyor having a scrap receiving end adjustably positioned adjacent said edge trimming station to continuously collect said metal edge scrap material trimmed from said moving strip of metal, and a scrap discharge end positioned adjacent the scrap disposal station;

means for directing said trimmed metal edge scrap material into a central part of said scrap receiving end of said tubular enclosed conveyor; and linear accelerator components uniformly axially disposed in a wall portion of said tubular enclosed conveyor over substantially the full length of said conveyor, said linear accelerator components acting in conjunction with said trimmed metal edge scrap material to continuously propel said collected trimmed metal edge scrap material to the scrap disposal station energization of said linear accelerator components causing said trimmed metal edge scrap material to pass through and remain in substantially a central axial portion of said tubular enclosed conveyor and to be substantially equidistant from successive portions of an inner wall surface of said tubular enclosed conveyor to maintain a substantially noiseless passage of said trimmed metal edge scrap material through said tubular enclosed conveyor from said scrap receiving end to said scrap discharge end.

2. The system as claimed in claim 1 wherein said scrap disposal station comprises a melting furnace means.

3. The system as claimed in claim 1 wherein said disposal station comprises an induction melting furnace means.

4. The system as claimed in claim 1 wherein said tubular enclosed conveyor is curvilinear.

5. A system as set forth in claim 1 wherein said linear accelerator components include annular AC windings and a core wire element, the core wire interconnecting said windings and in turn being connectable to a source of AC power.

6. The system as set forth in claim 1 wherein said tubular enclosed conveyor is constructed with a bend formed in a gradual arc to effect a gradual transition of said conveyor from a horizontal plane to a substantially vertical plane.

* * * * *